US010774785B2

(12) United States Patent
Poulton et al.

(10) Patent No.: US 10,774,785 B2
(45) Date of Patent: Sep. 15, 2020

(54) DEFLECTOR FOR A THRUST FLOW POWERED VEHICLE AND THRUST FLOW POWERED VEHICLE WITH SAID DEFLECTOR

(71) Applicant: MBDA UK LIMITED, Stevenage Hertfordshire (GB)

(72) Inventors: Ross William Poulton, Stevenage Hertfordshire (GB); Daemon Lee, Stevenage Hertfordshire (GB); Mohammad Azad Hussain, Stevenage Hertfordshire (GB); Anthony Machell, Stevenage Hertfordshire (GB)

(73) Assignee: MBDA UK LIMITED, Stevenage Hertfordshire (GB)

( * ) Notice: Subject to any disclaimer, the term of this patent is extended or adjusted under 35 U.S.C. 154(b) by 444 days.

(21) Appl. No.: 14/904,761

(22) PCT Filed: Jul. 10, 2014

(86) PCT No.: PCT/GB2014/052114
§ 371 (c)(1),
(2) Date: Jan. 13, 2016

(87) PCT Pub. No.: WO2015/008037
PCT Pub. Date: Jan. 22, 2015

(65) Prior Publication Data
US 2016/0177873 A1    Jun. 23, 2016

(30) Foreign Application Priority Data

Jul. 13, 2013  (GB) .................................. 1312593.5

(51) Int. Cl.
*F02K 1/00*     (2006.01)
*F02K 9/80*     (2006.01)
(Continued)

(52) U.S. Cl.
CPC .............. *F02K 1/002* (2013.01); *B63H 11/12* (2013.01); *B64G 1/40* (2013.01); *F02K 1/006* (2013.01);
(Continued)

(58) Field of Classification Search
CPC .......... F02K 1/002; F02K 1/006; F02K 1/008; F02K 9/30; F02K 9/88; F02K 9/90;
(Continued)

(56) References Cited

U.S. PATENT DOCUMENTS 3,094,072 A * 6/1963 Parilla ...................... B64C 9/38
102/381
3,139,725 A * 7/1964 Webb ....................... F02K 9/88
60/229

(Continued)

FOREIGN PATENT DOCUMENTS

GB    2068311 A    8/1981
GB    2172383 A    9/1986

OTHER PUBLICATIONS

Raharjo, Theory of Gas Turbine Engines, Feb. 19, 2010 (Year: 2010).*

(Continued)

*Primary Examiner* — Todd E Manahan
*Assistant Examiner* — Kyle Robert Thomas
(74) *Attorney, Agent, or Firm* — Scully Scott Murphy and Presser

(57) ABSTRACT

The present invention provides a thrust flow powered vehicle comprising a first thrust flow expeller for expelling a first thrust flow in a first direction, a second thrust flow expeller for expelling a second thrust flow in a second direction, the second direction being a different direction to the first direction but sharing a plane with the first direction, a thrust flow deflector surface at an angle to the plane of the (Continued)

first and second directions, and an outlet portion for providing an output thrust flow, such that, in use, the thrust flow deflector surface deflects at least a portion of both the first and second thrust flows to form the output thrust flow such that the output thrust flow has a component in the plane of the first and second directions, and a component out of that plane.

14 Claims, 7 Drawing Sheets

(51) Int. Cl.
| | |
|---|---|
| F02K 9/90 | (2006.01) |
| F02K 9/30 | (2006.01) |
| F41F 3/048 | (2006.01) |
| F42B 10/66 | (2006.01) |
| F41F 3/042 | (2006.01) |
| F02K 9/97 | (2006.01) |
| F42B 10/30 | (2006.01) |
| F02K 9/88 | (2006.01) |
| B63H 11/12 | (2006.01) |
| B64G 1/40 | (2006.01) |
| F02K 1/78 | (2006.01) |

(52) U.S. Cl.
CPC ............... *F02K 1/008* (2013.01); *F02K 1/78* (2013.01); *F02K 9/30* (2013.01); *F02K 9/805* (2013.01); *F02K 9/88* (2013.01); *F02K 9/90* (2013.01); *F02K 9/97* (2013.01); *F41F 3/042* (2013.01); *F41F 3/048* (2013.01); *F42B 10/30* (2013.01); *F42B 10/66* (2013.01); *F42B 10/663* (2013.01)

(58) Field of Classification Search
CPC ..... F02K 9/97; B64G 1/24; B64G 1/26; F41F 3/042; F41F 3/048; F42B 10/30; F42B 10/66; F42B 10/663

See application file for complete search history.

(56) References Cited

U.S. PATENT DOCUMENTS

| | | | |
|---|---|---|---|
| 3,245,620 | A | 4/1966 | McEwen |
| 3,312,068 | A * | 4/1967 | Sutor ..................... F02K 9/62 239/265.11 |
| 4,627,586 | A | 12/1986 | Krumins et al. |
| 4,637,572 | A * | 1/1987 | Metz ..................... F02K 9/805 244/3.22 |
| 5,170,964 | A | 12/1992 | Enderle et al. |
| 5,769,317 | A | 6/1998 | Sokhey et al. |
| 6,289,669 | B1 * | 9/2001 | Smirra ..................... F02K 1/00 60/229 |
| 2006/0107828 | A1 | 5/2006 | Veitch et al. |
| 2006/0242941 | A1 * | 11/2006 | Johnson ................... F02C 9/54 60/226.1 |
| 2009/0211258 | A1 | 8/2009 | Bulman |
| 2011/0131948 | A1 * | 6/2011 | Hollimon ............... B64D 33/04 60/232 |
| 2014/0007554 | A1 * | 1/2014 | Kochanek ................ F02K 1/00 60/204 |
| 2014/0145027 | A1 * | 5/2014 | Pogosyan ................ B64C 3/10 244/55 |

OTHER PUBLICATIONS

International Search Report and Written Opinion dated Oct. 31, 2014 issued in PCT/GB2014/052114.
GB Search Report dated Jan. 19, 2015 issued in GB 1412301.2.
GB Search Report dated Jan. 14, 2014 issued in GB 1312593.5.
International Preliminary Report on Patentability and Written Opinion dated Jan. 28, 2016 from related PCT/GB2014/052114.

* cited by examiner

PRIOR ART

DEFLECTOR FOR A THRUST FLOW POWERED VEHICLE AND THRUST FLOW POWERED VEHICLE WITH SAID DEFLECTOR

FIELD OF THE INVENTION

The present invention relates to thrust flow powered vehicles, such as missiles, jet skis or space vehicles. More particularly, but not exclusively, this invention concerns a thrust flow powered vehicle comprising a first thrust flow nozzle for expelling a first thrust flow in a first direction, and a second thrust flow nozzle for expelling a second thrust flow in a second direction, the second direction being a different direction to the first direction but sharing a plane with the first direction. The invention also concerns a method of operating a thrust flow powered vehicle and a thrust flow deflector for use as part of a thrust flow powered vehicle.

BACKGROUND ART

One example of a prior art missile launch is where a missile is launched vertically, using a piston powered launch pad at a launch site. This is known as a "cold launch" as the missile motor is not used to launch the missile. Once the missile is in the air, it can be turned to be horizontal using lateral gas thrusters. However, if the missile motor fails the missile would fall (an inert descent situation) and would land on or near the launch site. An example of such a launch is described in US 2006/0107828.

A second example of a prior art missile launch uses a similar missile to that of the first example. However, this second example missile has a rotatable thrust deflection device (called a "jetavator") attached to a nozzle of a lateral gas thrusters. A representation of the jetavator 1 is shown in FIG. 1. The jetavator deflects some of the lateral flow from the nozzle 2 to provide an axial (longitudinal) component of thrust flow. The jetavator 1 is rotatable in relation to the nozzle 2. This means that the missile rotates laterally to be horizontal (as before) but also moves axially (longitudinally). This moves the missile horizontally away from the launch site and is advantageous for safety and/or tactical reasons. Therefore, if the missile motor should fail, the missile would not fall and land on or near the launch site. It is also possible to have more than one jetavator, each jetavator deflecting lateral flow from a different nozzle.

However, the control system required to control the rotation of the jetavator(s) to provide the required amount of axial thrust flow is complex. It is also necessary to provide sealing (shown by reference numeral 3 in FIG. 1) to seal the jetavator over the nozzle. In addition, it is difficult to retrofit such a jetavator and control system to an existing missile due to requiring significant space and requiring a significant redesign.

DISCLOSURE OF THE INVENTION

The present invention seeks to mitigate the above-mentioned problems. Alternatively or additionally, the present invention seeks to provide an improved thrust flow powered vehicle.

The present invention provides, according to a first aspect, a thrust flow powered vehicle comprising a first thrust flow expeller for expelling a first thrust flow in a first direction, a second thrust flow expeller for expelling a second thrust flow in a second direction, the second direction being a different direction to the first direction but sharing a plane with the first direction, a thrust flow outlet fairing associated with both the first and second thrust flow expellers, comprising a thrust flow deflector surface comprising a portion at an angle to the plane of the first and second directions, and an outlet portion through which an output thrust flow is to be expelled, such that, in use, the thrust flow deflector surface deflects at least a portion of both the first and second thrust flows to form the output thrust flow such that the output thrust flow has a component in the plane of the first and second directions, and a component out of the plane of the first and second directions.

A thrust powered vehicle is intended to cover any moveable transport device that uses a thrust flow to move the device, which may or may not be able to accommodate passengers and/or cargo. For example, it may be a missile (that does not accommodate passengers, but may contain a cargo), a jet ski (that is intended to accommodate at least one passenger and not intended to transport cargo) or a spacecraft (that may or may not accommodate one or more passengers and/or cargo).

Having a thrust flow outlet fairing over at least a portion of both the first and second thrust flow expellers allows a thrust flow deflector surface of the thrust flow outlet fairing to be at an angle to the plane of the first and second directions, and able to deflect at least a portion of both the first and second thrust flows to form the output thrust flow (with a component in the plane of the first and second directions, and a component out of the plane of the first and second directions) provided by the outlet portion.

The amount of the different components, and therefore, the amount of thrust provided to the vehicle in the different directions, can be varied by changing the amounts and the relative amounts of flow coming out of each of the first and second thrust flow expellers. This means that there is no need for a separate control system, for example, for adjusting the angle of the thrust flow deflector surface. This makes the thrust flow powered vehicle potentially cheaper to make, more reliable, easier to maintain and/or lighter.

The first and second directions are considered to be the average direction of the first and second flows, respectively. For example, flow expellers can expel flow in a range, generally a small range, of directions. However, here the average direction is meant. The invention is not concerned with simply expanding a flow (and therefore allowing the direction of parts of the flow to evenly expand to different directions, where the average direction of the flow does not change).

Preferably, the first and second thrust flow expellers comprise nozzles.

Preferably, the plane of the first and second directions is a lateral plane with respect to the vehicle and wherein the thrust flow deflector surface deflects at least a portion of both the first and second thrust flows in an axial (longitudinal) direction with respect to the vehicle, such that the output thrust flow has both a lateral and an axial component with respect to the vehicle. This means that the first and second thrust flow expellers naturally provide a lateral thrust and the thrust flow deflector surface deflects this lateral thrust to also provide an axial thrust component.

Preferably, the outlet portion comprises a single outlet for providing a single output thrust flow.

Preferably, the outlet fairing is substantially in the shape of a wedge, with a short angled portion towards one end and a tapered portion towards an opposite end and wherein, preferably, the outlet portion is located on the short angled portion of the outlet fairing. This is an especially aerodynamic shape to make the vehicle more efficient.

It is noted that the thrust flow deflector surface is a single surface that deflects at least a portion of both the first and second thrust flows.

Preferably, the thrust flow deflector surface is fixed in position relative to the expellers. In other words the thrust flow deflector surface is not controllable to be rotated to affect the deflection of the thrust flows. This means that there is no control system for the thrust flow deflector surface, which makes the thrust flow powered vehicle potentially cheaper, more reliable, easier to maintain and/or lighter.

Preferably, the thrust flow deflector surface is curved such that it extends from being in the plane of the first and second directions to being at an angle to the plane of the first and second directions. This means that the deflection is a gradual deflection, resulting in an aerodynamically efficient arrangement, with minimal drag and flow turbulence.

Preferably, the thrust flow deflector surface has a maximum angle of between 5 and 30 degrees to the plane of the first and second directions. This provides adequate axial thrust whilst still providing an aerodynamically efficient arrangement.

Preferably, the thrust flow powered vehicle further comprises a tubular extension on the outlet portion, and wherein, preferably, the thrust flow deflector surface has a maximum angle of over 10 degrees to the plane of the first and second directions. The tubular extension is for extending the length over which deflection of the thrust flows takes place. Having a tubular extension minimises the drag and flow turbulence of the arrangement and is particularly advantageous when the maximum angle of the deflector surface is over 10 degrees.

More preferably, the tubular extension has a length similar to the diameter of the first thrust flow expeller and/or the second thrust flow expeller. This provides an especially efficient arrangement, which minimises the shock waves caused by the deflected flow.

Preferably, the first direction is substantially orthogonal to the second direction. This gives maximum flexibility in the control of the direction, especially the lateral direction, of the vehicle.

Preferably, the first thrust flow to be expelled by the first thrust flow expeller and the second thrust flow to be expelled by the second thrust flow expeller are independently controllable.

Preferably, the vehicle is a missile, jet ski or a space vehicle. More preferably the vehicle is a missile. Even more preferably, the vehicle is a missile for use in a cold launch system. In other words, the missile motor is not used to launch the missile and instead the missile is launched by an external, for example, a piston powered launch pad at a launch site.

According to a second aspect of the invention there is also provided a method of operating a thrust flow powered vehicle, the method comprising the steps of expelling a first thrust flow in a first direction from a first expeller of the vehicle, expelling a second thrust flow in a second direction from a second expeller of the vehicle, the second direction being a different direction to the first direction but sharing a plane with the first direction, and using a deflector over at least a portion of both the first and second expellers to deflect at least a portion of both the first thrust flow and the second thrust flow to provide an output thrust flow with both a lateral and an axial component relative to the vehicle, thereby moving the vehicle in a lateral and an axial direction.

Preferably, the first thrust flow expelled and the second thrust flow expelled are controlled independently.

According to a third aspect of the invention there is also provided a thrust flow deflector for use as part of a thrust flow powered vehicle, the deflector comprising an inlet portion for receiving a first inlet thrust flow in a first direction, and a second inlet thrust flow in a second direction, the second direction being a different direction to the first direction but sharing a plane with the first direction, an outlet portion for providing an output thrust flow, and a thrust flow deflector element in between the inlet portion and the outlet portion, for deflecting at least a portion of both the first and second inlet thrust flows to form the output thrust flow, the deflector element having a deflector surface at an angle to the plane of the first and second directions, such that, in use, there is provided an output thrust flow with a component in the plane of the first and second directions, and a component out of the plane of the first and second directions.

It is possible to retrofit such a thrust flow deflector to an existing thrust flow powered vehicle that has a twin expeller arrangement. The thrust flow deflector may be attached across the exit plane of the twin expellers.

It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF THE DRAWINGS

Embodiments of the present invention will now be described by way of example only with reference to the accompanying schematic drawings of which.

DETAILED DESCRIPTION

Figure 1:
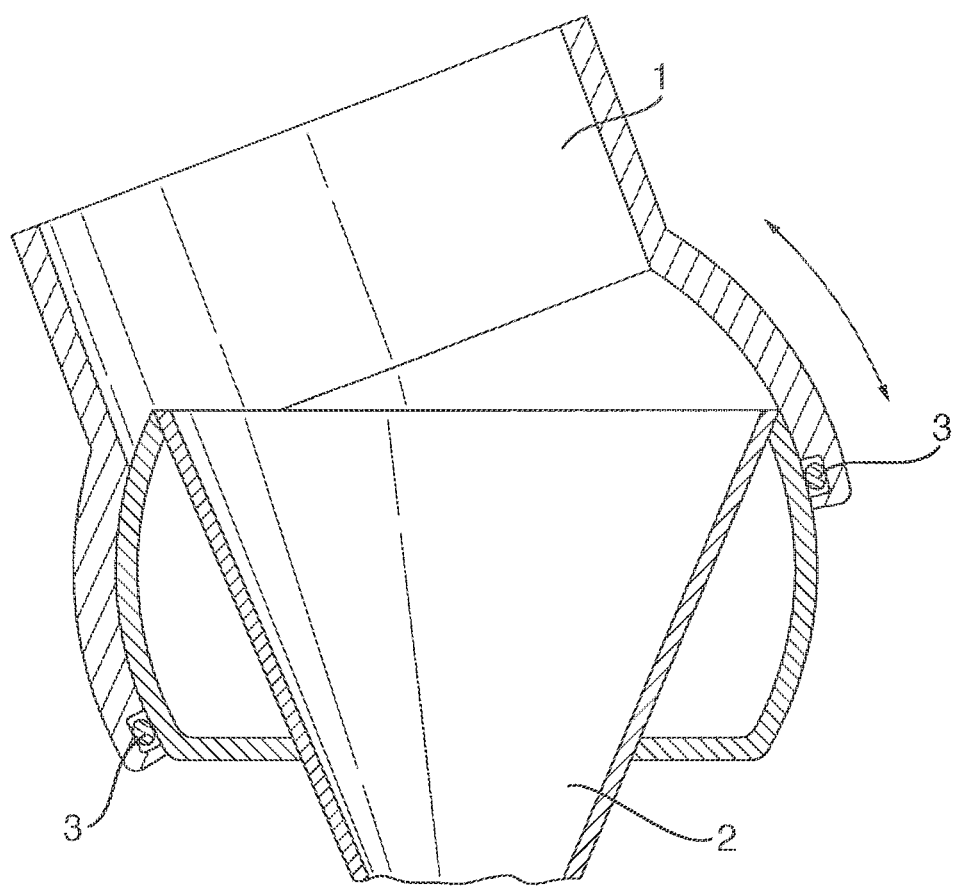
FIG. 1 shows a side view of a jetavator according to the prior art.
Figure 2:
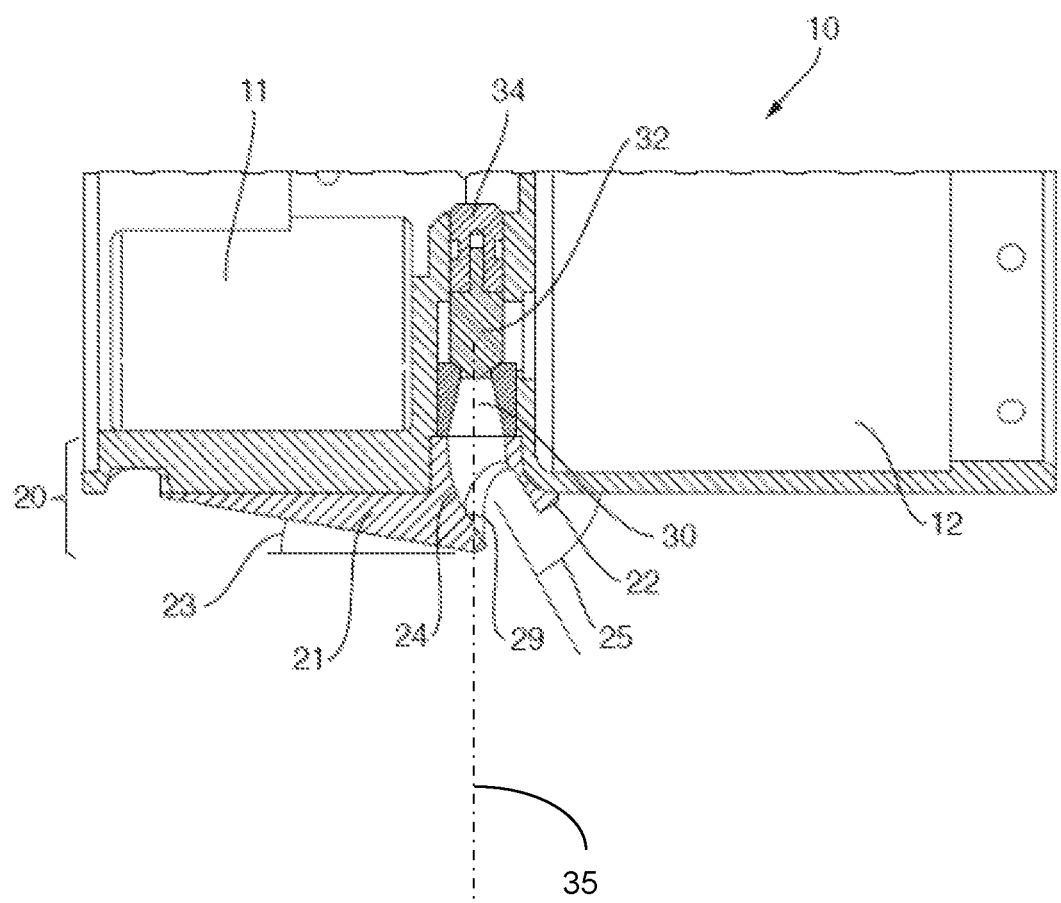
FIG. 2 shows a cutaway side view of part of a missile according to a first embodiment of the invention.

FIG. 2 shows a cutaway side view of part of a missile 10 according to a first embodiment of the invention. In this part of the missile 10, there is a control system 11 for the missile and a gas generator 12. The gas generator is used to provide high pressure propellant to be expelled from the missile 10. The propellant is expelled at a speed of approximately Mach 3.

The propellant is expelled via expansion cone nozzles (first nozzle shown as reference numeral 30). It is to be noted that there is also a second nozzle (not shown) adjacent to the first nozzle 30 and orthogonal to it. The first nozzle 30 expels propellant downward (as shown on the page), whereas the second nozzle is behind the first nozzle and expels propellant outwards (i.e. out of the page). Hence, the propellant flow out of both nozzles is in a shared lateral plane 35, this lateral plane 35 extending in and out of the page along a line going through the central axis of the first nozzle 30 shown. Other than the orientation and position of the first and second nozzles, they are identical.

Each nozzle has an associated piston (the piston of the first nozzle 30 is shown as reference numeral 32) behind the nozzle to control the expelling of the high pressure propellant. Each piston has an associated piston controller located behind the piston (the piston controller of the first nozzle 30 is shown as reference numeral 34).

Attached to the side of the missile 10 immediately in front of the nozzles is an outlet fairing 20. The outlet fairing is made of titanium. The outlet fairing is a wedge shape with a long shallow angled side 21 and a short high-angled end portion 22. The long shallow side 21 is at an angle 23 to the rest of the side of the missile. This angle 23 is 15 degrees.

It is noted that the outlet fairing 20 is typically subjected to propellant temperatures in excess of 2000 degrees Kelvin and the outside of the fairing 20 is typically subjected to "aero heating" of approximately 500 degrees Kelvin. The outlet fairing 20 is designed to be aerodynamic.

Between the outlet ends of the nozzles and the short high-angled end portion 22 is a curved flow deflector surface 24 that deflects the flow from both first 30 and second nozzles. This flow deflector surface 24 deflects the flow out of the lateral plane 35 to have an axial (longitudinal) component (i.e. a component that is horizontal on the page). It can be seen that it continues the expansion of the expansion cone nozzles but at an angle to the lateral plane 35.

The resultant deflected flow is expelled from the outlet fairing at an angle 25 to the side of the missile. This angle 25 is 60 degrees. In other words, the propellant has been deflected 30 degrees from the lateral plane 35.

As the propellant is expelled at Mach 3, the deflection at angles of more than 15 degrees (here it is 30 degrees) causes significant losses due to shock waves forming. Hence a short tubular extension 29 is used. This short tubular extension 29 has a length corresponding to the diameter of the outlet (expanded) end of the first and second nozzles.

Figure 3:
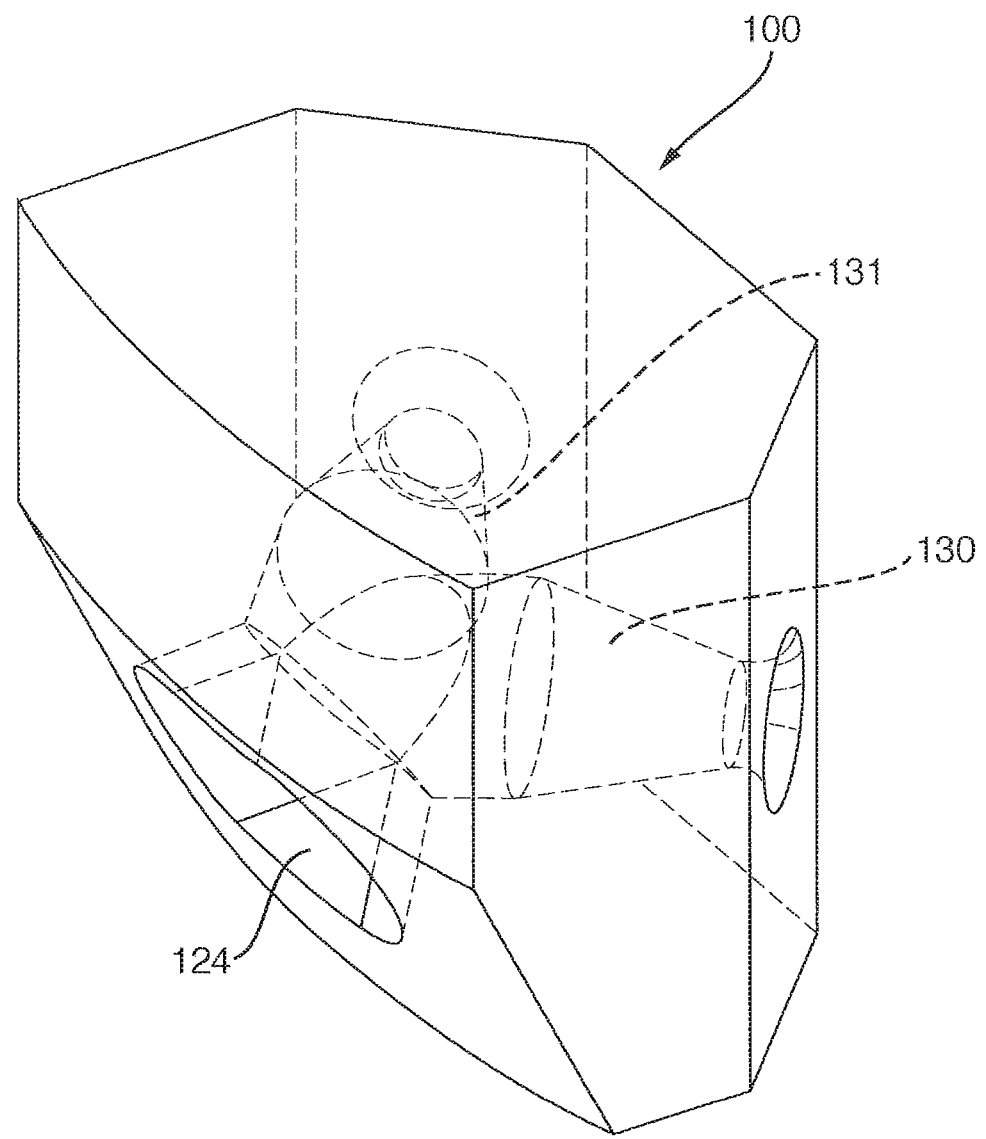
FIG. 3 shows an enlarged view of part of a missile according to a second embodiment of the invention.

FIG. 3 shows an enlarged view of part of a missile 100 according to a second embodiment of the invention. This second embodiment is similar to the first embodiment. Here, there are shown two orthogonal expansion cone nozzles in a shared lateral plane; first nozzle 130 and second nozzle 131.

Also, shown is a flow deflector surface 124 for deflecting the two orthogonal propellant flows from the first 130 and second 131 nozzles. The flow deflector surface 124 deflects the propellant flow to have an axial component.

Figure 4:
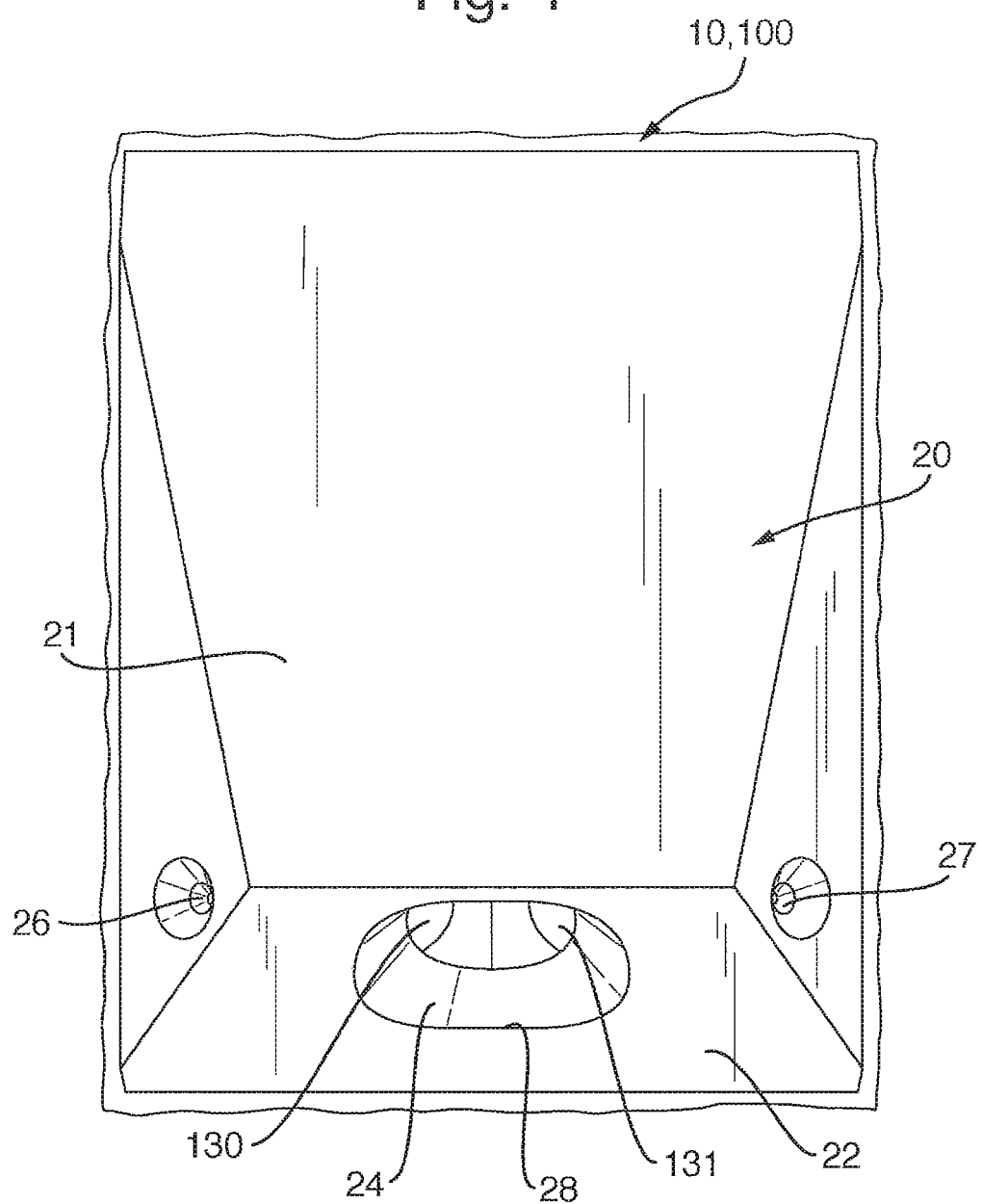
FIG. 4 shows a plan view of an outlet fairing for use on the missile of FIG. 2 or FIG. 3.

FIG. 4 shows a plan view of an outlet fairing 20 for use on the missile of FIG. 2 (missile 10) or FIG. 3 (missile 100). Here, the wedge shape of the faring can be seen clearly, with long shallow side 21 and short high-angles end portion 22.

The outlet fairing 20 also comprises two side fixing points 26, 27 for attaching the outlet fairing to a side of the missile 10, 100. These fixing points are sunken holes in the sides of the fairing 20 for accommodating bolts. There is also provided sealant (not shown) around the outlet fairing 20 to prevent leakage or blowback.

In the high-angled end portion 22 is a flow deflector surface 24 leading to an outlet 28. Here, the two orthogonal nozzles 130, 131 can be seen expelling propellant towards the flow deflector surface 24.

Figure 5:
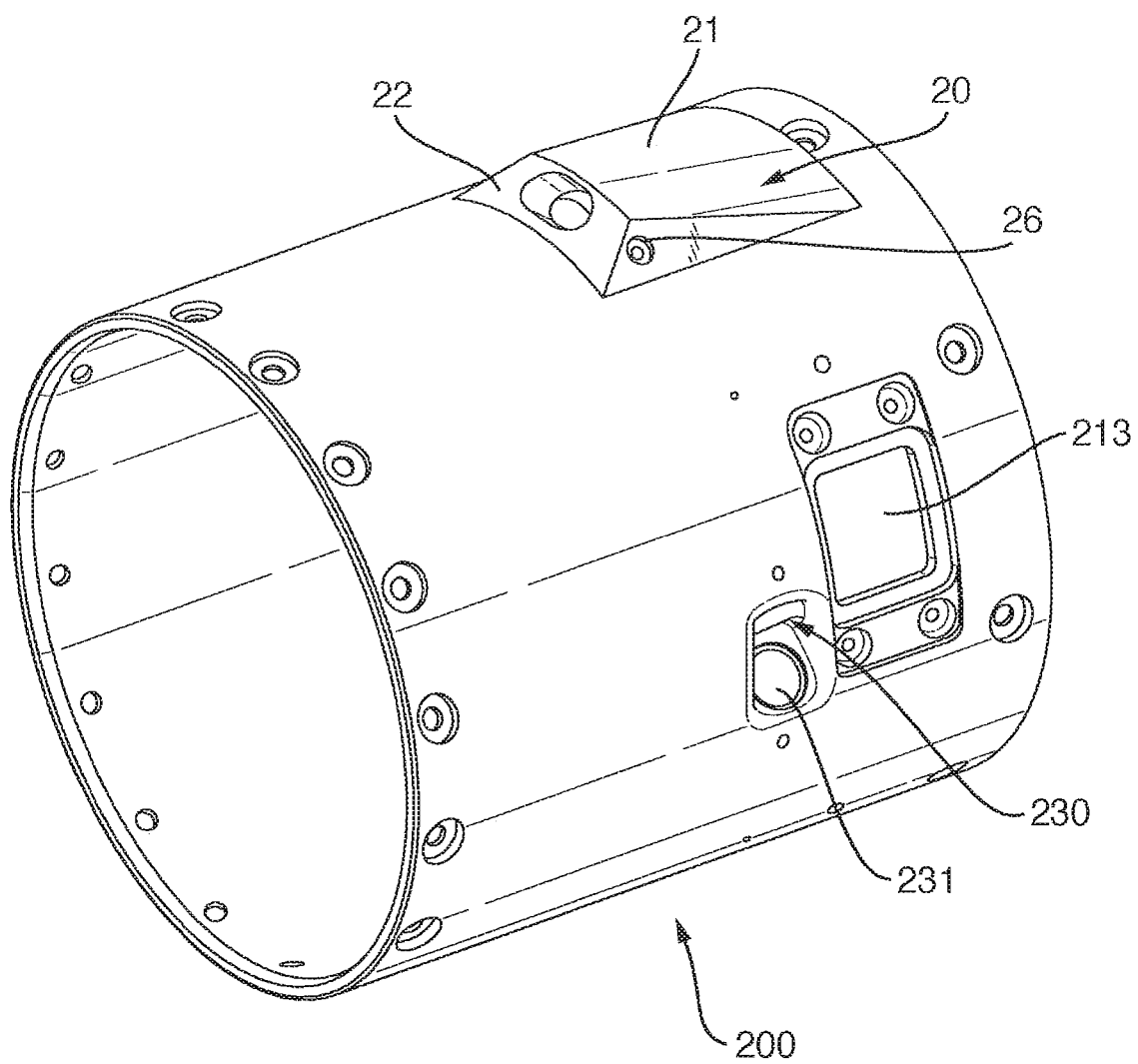
FIG. 5 shows the outlet fairing of FIG. 4 mounted on part of a missile according to a third embodiment of the invention.

FIG. 5 shows the outlet fairing 20 of FIG. 4 mounted on part of a missile 200 according to a third embodiment of the invention. This third embodiment is similar to the first and second embodiments. The missile comprises two pairs of nozzles; a first pair 230, 231 being shown without a fairing in place over them and a second pair that are covered by the outlet fairing 20.

Here, at a lower portion of the figure, two orthogonal expansion cone nozzles 230, 231 can be seen, arranged to expel propellant in a lateral plane. The outlet fairing 20 has been removed from the figure to allow the position and orientation of the nozzles 230, 231 to be seen. A hatch 213 adjacent to the nozzles 230, 231 provides access to the inside of the outlet fairing 20 when it is attached to the missile 200.

At an upper portion of the figure, an outlet fairing 20 can be seen. The outlet fairing 20 is attached over two nozzles (not seen clearly in the figure). These nozzles are similar to nozzles 230, 231. The long shallow side 21 and high-angled end portion 22 of the fairing 20 can be seen. Also, the fixing point 26 on one side of the outlet fairing 20 is also shown.

Figure 6:
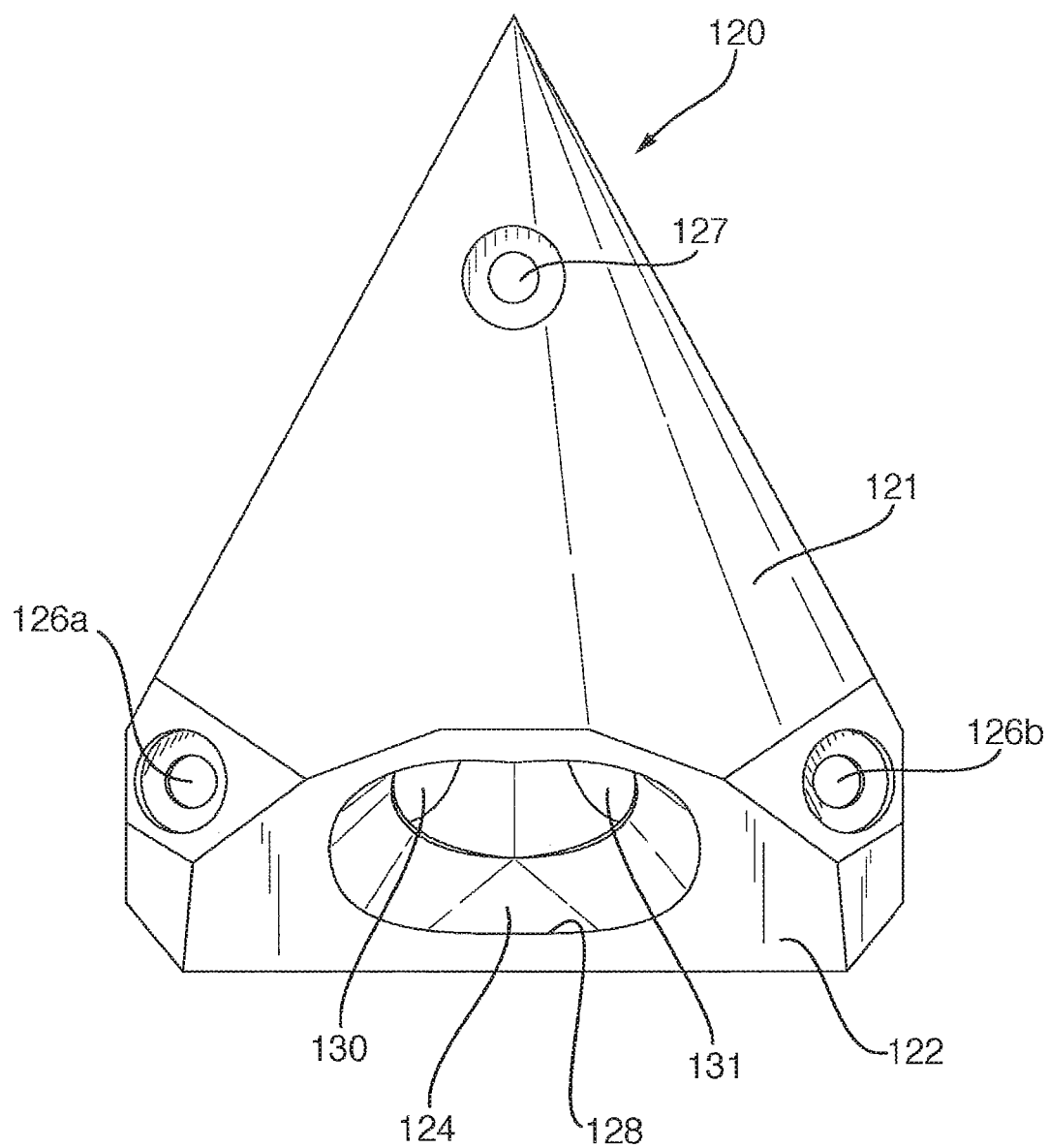
FIG. 6 shows a plan view of a different outlet fairing for use on the missile of FIG. 2, 3 or 5.

FIG. 6 shows a plan view of an outlet fairing 120 for use on the missile of FIG. 2 (missile 10), FIG. 3 (missile 100) or FIG. 5 (missile 200). Here, the fairing 120 is a triangular wedge shape, with long shallow side 121 and short high-angles end portion 122.

The outlet fairing 120 also comprises two side fixing points 126a, 126b and an end fixing point 127 for attaching the outlet fairing to a side of the missile 10, 100, 200. These fixing points are sunken holes in the fairing 120 for accommodating bolts. There is also provided sealant (not shown) around the outlet fairing 120 to prevent leakage or blowback.

In the high-angled end portion 122 is a flow deflector surface 124 leading to an outlet 128. Here, the two orthogonal nozzles 130, 131 can be seen expelling propellant towards the flow deflector surface 124.

Figure 7:
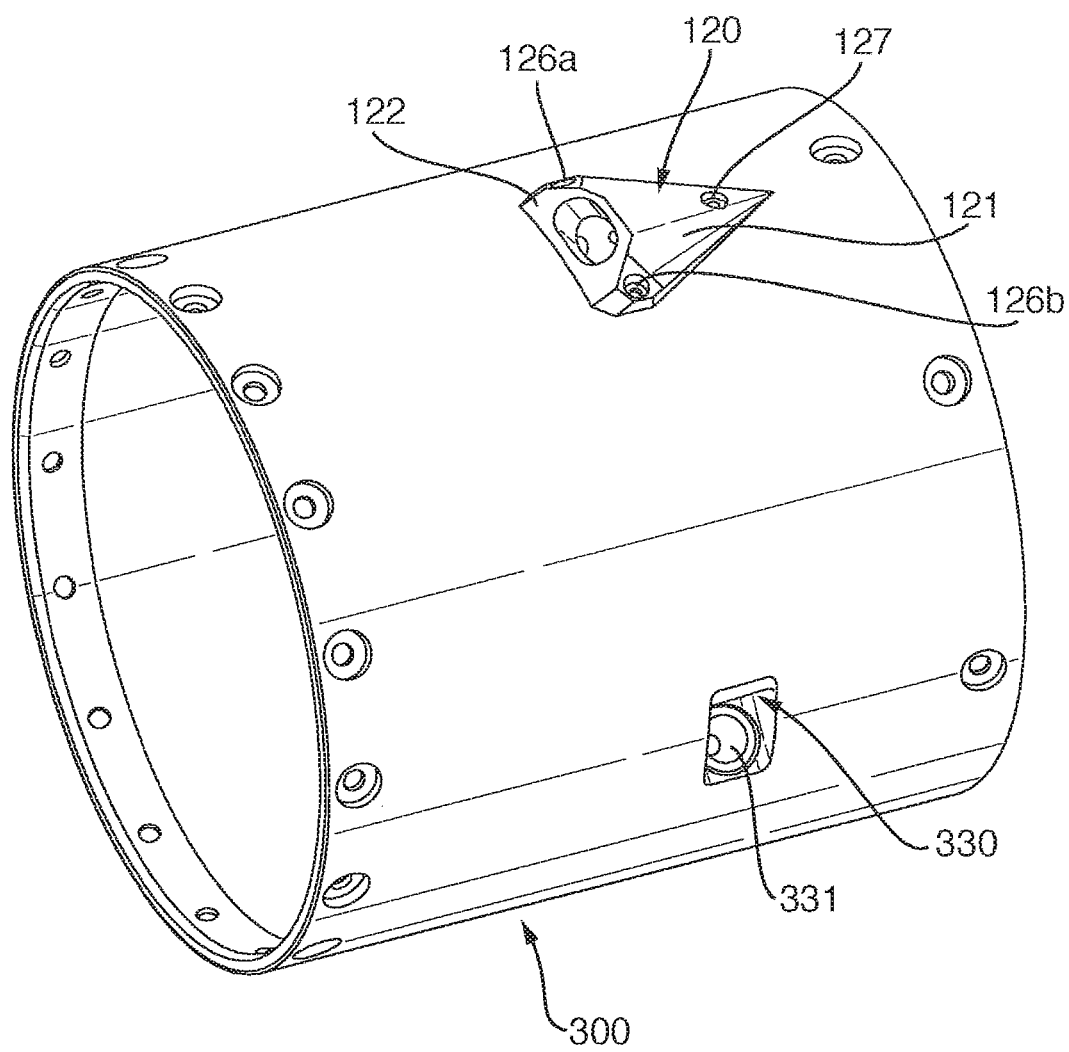
FIG. 7 shows the outlet fairing of FIG. 6 mounted on part of a missile according to a fourth embodiment of the invention.

FIG. 7 shows the outlet fairing 120 of FIG. 6 mounted on part of a missile 300 according to a fourth embodiment of the invention. This fourth embodiment is similar to the first, second and third embodiments.

Here, at a lower portion of the figure, two orthogonal expansion cone nozzles 330, 331 can be seen, arranged to expel propellant in a lateral plane. The outlet fairing 120 has been removed from the figure to allow the position and orientation of the nozzles 330, 331 to be seen.

At an upper portion of the figure, an outlet fairing 120 can be seen. The outlet fairing 120 is attached over two nozzles (not seen clearly in the figure). These nozzles are similar to nozzles 330, 331. The long shallow side 121 and high-angled end portion 122 of the fairing 120 can be seen. Also, the fixing points 126a, 126b and 127 on the outlet fairing 120 are also shown.

In use of all of the above embodiments, an outlet fairing 20, 120 is fixed to a missile (10, 100, 200 or 300) by fixing points 26 (a and b), 27 and sealant (not shown) is applied around the outlet fairing 20, 120. After the missile 10, 100, 200, 300 is cold launched vertically from a launch site, gas generated in gas generator 12 is expelled using the piston nozzles 32, through the nozzles 30, 130, 131, 230, 231, 330, 331 in a lateral plane of the missile 10, 100, 200, 300. This lateral flow component provides lateral thrust to turn the missile 10, 100, 200, 300 from a vertical orientation to a horizontal orientation.

This propellant is deflected by the flow deflector surface 24, 124 of the outlet fairing 20, 120 to also have an axial component. In other words, the propellant is deflected to have a component parallel to the axis of the missile 10, 100, 200, 300. This means that thrust is provided in the axial direction which propels the missile 10, 100, 200, 300 forwards and moves it away (in a horizontal sense) from the launch site. Hence, if the main missile motor is not ignited properly, the missile 10, 100, 200, 300 will not fall back down near to the launch site.

The amount of lateral and axial thrust provided by the propellant to the missile 10, 100, 200, 300 is controlled by the control system 11 and piston controllers 34 by controlling the amount of propellant expelled from each of the nozzles 30, 130, 131, 230, 231, 330, 331. This variable flow expelled from the nozzles allows a variable resultant force to be achieved that can be varied through 90 degrees laterally and up to 30 degrees axially (longitudinally). Using the control system 11 and piston controllers 34 to control the amount of axial thrust means there is no need for a separate control system to control the rotation of the nozzles 30, 130, 131, 230, 231, 330, 331. In addition, it is possible to retrofit such a fairing 20, 120 to any existing missile with a twin expeller arrangement.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Instead of having nozzles 30, 130, 131, 230, 231, 330, 331, any of the embodiments of the invention may employ jet pipes for expelling the propellant from the missile.

The fairings 20, 120 in any of the embodiments may be made from steel, instead of titanium. In addition, the fairings 20, 120 in any of the embodiments may be coated with a thermal barrier such as Zirconia, especially if they are designed for long duration use. As a further alternative, the fairings 20, 120 in any of the embodiments may be made from composites or plastics, especially if a cold propellant was used.

In the above described embodiments, the flow deflector surface 24, 124 is fixed. However, as an alternative, the outlet could be an actuated device, for example a rotating device, to vary the angle of the output flow with respect to the axial (longitudinal) direction. The outlet could be a combination of a fixed fairing and an actuated device. The actuated device may be hinged at the nozzle exit plane and may comprise gas passageways passing through a rotatable ball joint.

In the above described embodiments, the flow deflector surface 24, 124 is at an angle of 30 degrees. However, it could be at any angle up to 30 degrees. Angles over 30 degrees could be used but these are not considered to be likely as at above 30 degrees the losses experienced begin to significantly reduce performance of the missile.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A thrust flow deflector for use as part of a thrust flow powered vehicle, the deflector comprising;
an inlet portion for receiving:
a first inlet thrust flow in a first direction, and
a second inlet thrust flow in a second direction, the second direction being a different direction to the first direction but sharing a plane with the first direction,
an outlet portion for providing an output thrust flow which is to be expelled from the vehicle, and
a thrust flow deflector element in between the inlet portion and the outlet portion, for deflecting at least a portion of both the first and second inlet thrust flows to form the output thrust flow, the deflector element having a deflector surface at an angle to the plane of the first and second directions, the first direction and the second direction meeting each other at or near the deflector surface, such that, in use, the output thrust flow has a component in the plane of the first and second directions, and a component out of the plane of the first and second directions and wherein the thrust flow deflector is substantially in the shape of a wedge, with a shorter angled portion towards one end and a longer tapered portion towards an opposite end and wherein the shorter angled portion of the outlet fairing has an single opening for providing a single output thrust flow, the single opening forms the outlet portion, wherein the shorter angled portion is shorter in length than the longer tapered portion.

2. A thrust flow powered vehicle comprising an output thrust flow arrangement having:
a first thrust flow expeller for expelling a first thrust flow in a first direction,
a second thrust flow expeller for expelling a second thrust flow in a second direction, the second direction being a different direction to the first direction but sharing a plane with the first direction,
a thrust flow outlet fairing associated with both the first and second thrust flow expellers, comprising:
a thrust flow deflector surface comprising a portion at an angle to the plane of the first and second directions, the first direction and the second direction meeting each other at or near the thrust flow deflector surface, and
an outlet portion through which an output thrust flow is to be expelled from the vehicle, such that, in use of the arrangement, the thrust flow deflector surface deflects at least a portion of both the first and second thrust flows to form the arrangement's output thrust flow such that the output thrust flow has a component in the plane of the first and second directions, and a component out of the plane of the first and second directions, the first thrust flow to be expelled by the first thrust flow expeller and the second thrust flow to be expelled by the second thrust flow expeller being independently controllable so as to vary the amount of thrust provided by the output thrust flow to the vehicle, via the deflector surface, in the first and second directions, and wherein the outlet portion comprises a single outlet for providing a single output thrust flow,
wherein the thrust flow deflector surface is fixed in position relative to the expellers.

3. A thrust flow powered vehicle as claimed in claim 2, wherein the plane of the first and second directions is a lateral plane with respect to the vehicle and wherein the thrust flow deflector surface deflects said at least a portion of both the first and second thrust flows in an axial direction with respect to the vehicle, such that the components of the output thrust flow comprise both a lateral and an axial component with respect to the vehicle.

4. A thrust flow powered vehicle as claimed in claim 2, wherein the outlet fairing is substantially in the shape of a wedge, with a shorter angled portion towards one end and a longer tapered portion towards an opposite end and wherein the outlet portion is located on the shorter angled portion of the outlet fairing, wherein the shorter angled portion is shorter in length than the longer tapered portion.

5. A thrust flow powered vehicle as claimed in claim 2, wherein the thrust flow deflector surface is curved such that it extends from being in the plane of the first and second directions to being at an angle to the plane of the first and second directions.

6. A thrust flow powered vehicle as claimed in claim 2, wherein the thrust flow deflector surface has a maximum angle of between 5 and 30 degrees to the plane of the first and second directions.

7. A thrust flow powered vehicle as claimed in claim 2, wherein the thrust flow powered vehicle further comprises a tubular extension on the outlet portion.

8. A thrust flow powered vehicle as claimed in claim 7, wherein the tubular extension has a length corresponding to the diameter of the first thrust flow expeller and/or the second thrust flow expeller.

9. A thrust flow powered vehicle as claimed in claim 7, wherein the thrust flow deflector surface has a maximum angle of over 10 degrees to the plane of the first and second directions.

10. A thrust flow powered vehicle as claimed in claim 2, wherein the first direction is substantially orthogonal to the second direction.

11. A thrust flow powered vehicle as claimed in claim 2, wherein the vehicle comprises at least two of the output thrust flow arrangements for producing respective independently controllable output thrust flows for steering the vehicle, each arrangement being attached to a side of the vehicle.

12. A thrust flow powered vehicle comprising an output thrust flow arrangement having:
 a first thrust flow expeller for expelling a first thrust flow in a first direction,
 a second thrust flow expeller for expelling a second thrust flow in a second direction, the second direction being a different direction to the first direction but sharing a plane with the first direction,
 a thrust flow outlet fairing associated with both the first and second thrust flow expellers, comprising:
  a thrust flow deflector surface comprising a portion at an angle to the plane of the first and second directions, the first direction and the second direction meeting each other at or near the thrust flow deflector surface, and
  an outlet portion through which an output thrust flow is to be expelled from the vehicle, such that, in use of the arrangement, the thrust flow deflector surface deflects at least a portion of both the first and second thrust flows to form the arrangement's output thrust flow such that the output thrust flow has a component in the plane of the first and second directions, and a component out of the plane of the first and second directions, the first thrust flow to be expelled by the first thrust flow expeller and the second thrust flow to be expelled by the second thrust flow expeller being independently controllable so as to vary the amount of thrust provided by the output thrust flow to the vehicle, via the deflector surface, in the first and second directions, and wherein the outlet portion comprises a single outlet for providing a single output thrust flow, wherein the vehicle is a missile, jet ski or a space vehicle.

13. A method of operating a thrust flow powered vehicle, the method comprising the steps of:
 i. expelling a first thrust flow in a first direction from a first expeller of the vehicle,
 ii. expelling a second thrust flow in a second direction from a second expeller of the vehicle, the second direction being a different direction to the first direction but sharing a plane with the first direction, and
 iii. using a deflector, at or near a point where the first direction and the second direction meet each other, over at least a portion of both the first and second expellers to deflect at least a portion of both the first thrust flow and the second thrust flow to provide an output thrust flow having a component in the plane of the first and second directions, and a component out of the plane of the first and second directions, and wherein the output thrust flow exits the vehicle via a single outlet for providing a single output thrust flow, and
 iv. controlling independently the first thrust flow expelled and the second thrust flow expelled, thereby moving the vehicle in a lateral and an axial direction, wherein the controlling independently comprises adjusting the relative flows from the first expeller and the second expeller to move the vehicle in the lateral and/or the axial direction.

14. A method of operating a thrust flow powered vehicle according to claim 13, further comprising repeating steps i. to iv. with respect to at least a third expeller and a fourth expeller, and a second deflector, the second deflector is associated with the third expeller and the fourth expeller, thereby providing at least two output thrust flows through at least two outlets, respectively, for moving the vehicle in the lateral and the axial direction.

* * * * *